United States Patent
Nagai

(10) Patent No.: US 11,033,363 B2
(45) Date of Patent: Jun. 15, 2021

(54) ORTHODONTIC APPLIANCE FOR DENTISTRY

(71) Applicant: NN CO., LTD., Nagano (JP)

(72) Inventor: Mikiko Nagai, Nagano (JP)

(73) Assignee: NN CO., LTD., Nagano (JP)

( * ) Notice: Subject to any disclaimer, the term of this patent is extended or adjusted under 35 U.S.C. 154(b) by 83 days.

(21) Appl. No.: 16/309,618

(22) PCT Filed: Jul. 4, 2017

(86) PCT No.: PCT/JP2017/024417
§ 371 (c)(1),
(2) Date: Jan. 19, 2019

(87) PCT Pub. No.: WO2018/008616
PCT Pub. Date: Jan. 11, 2018

(65) Prior Publication Data
US 2019/0247148 A1    Aug. 15, 2019

(30) Foreign Application Priority Data
Jul. 6, 2016   (JP) ............................. JP2016-134009

(51) Int. Cl.
*A61C 7/08*     (2006.01)
*A61C 7/10*     (2006.01)
*A61C 7/36*     (2006.01)

(52) U.S. Cl.
CPC .................. *A61C 7/08* (2013.01); *A61C 7/10* (2013.01); *A61C 7/36* (2013.01)

(58) Field of Classification Search
CPC ................ A61C 7/36; A61C 7/08; A61C 7/10
See application file for complete search history.

(56) References Cited

U.S. PATENT DOCUMENTS 4,969,822 A * 11/1990 Summer ................... A61C 7/36
                                                     433/19
5,443,384 A *  8/1995 Franseen .................. A61C 7/00
                                                     433/18
(Continued)

FOREIGN PATENT DOCUMENTS

JP     2014-023672 A    2/2014
JP     2015-150179 A    8/2015

*Primary Examiner* — Ralph A Lewis
(74) *Attorney, Agent, or Firm* — Im IP Law; Chai Im; C. Andrew Im

(57) ABSTRACT

An orthodontic appliance that by ensuring proper occlusal position of teeth in an oral cavity enables teeth straightening to thereby achieve precise correction ensuring proper occlusion and enables performance of teeth straightening by residing in the oral cavity for a certain time period such as during sleep. A configuration includes an orthodontic unit to be removably fitted in the oral cavity and molar caps erected near the orthodontic device. The orthodontic unit includes a pair of U-shaped devices formed of a maxillary orthodontic unit and a mandibular orthodontic unit united by wires. Teeth are straightened while adjusting positions of upper and lower jaws. The molar caps include large covering lids for anchoring that are slightly higher than surrounding teeth. The orthodontic unit is mounted on outer peripheries of the molar caps by locking to the molar caps through grooves provided in the maxillary orthodontic unit of the orthodontic unit.

2 Claims, 2 Drawing Sheets

(56) References Cited

U.S. PATENT DOCUMENTS

| | | | |
|---|---|---|---|
| 5,697,781 A * | 12/1997 | Ellingson | A61C 7/36 433/18 |
| 7,578,671 B2 * | 8/2009 | Corcoran | A61C 7/36 433/179 |
| 8,517,726 B2 * | 8/2013 | Kakavand | A61C 7/08 433/6 |
| 8,567,408 B2 * | 10/2013 | Roettger | A63B 71/085 128/861 |
| 9,545,332 B2 * | 1/2017 | Luco | A61F 5/566 |
| 10,111,739 B2 * | 10/2018 | Benoit | A61F 2/0095 |
| 2004/0009449 A1 | 1/2004 | Mah et al. | |
| 2004/0134499 A1 | 7/2004 | Sabbagh | |
| 2011/0094522 A1 | 4/2011 | Weisflog | |
| 2014/0335465 A1 | 11/2014 | Hang | |

* cited by examiner

ORTHODONTIC APPLIANCE FOR DENTISTRY

RELATED APPLICATIONS

This application is a § 371 application from PCT/JP2017/024417 filed Jul. 4, 2017, which claims priority from Japanese Patent Application No. 2016-134009 filed Jul. 6, 2016, each of which is herein incorporated by reference in its entirety.

TECHNICAL FIELD

The present invention relates to an orthodontic appliance used mainly for teeth straightening, particularly to an orthodontic appliance that by ensuring proper occlusal position of teeth in oral cavity enables teeth straightening when residing in mouth for a certain period of time such as while sleeping.

BACKGROUND OF THE INVENTION

Various appliances have been developed and used to straighten teeth. Orthodontics is a dental specialty that treats misalignment of teeth. The treatment corrects occlusal misalignment chiefly by utilizing orthodontic force of wires and the like to move teeth to proper position.

One long-used orthodontic treatment is multibracket therapy. This treatment straightens teeth by fitting brackets on surfaces of teeth to be moved and moving these teeth using wires interconnecting the fitted brackets. This method has a number of problems, including that removing matter from around the teeth is difficult because the appliance cannot be removed until the treatment is completed, that straightening of teeth by gradually tightening wires to forcibly move the teeth produces an unnatural sensation so long as the appliance is in place and in the worst case may cause pain or itching, and that when the brackets are fitted on the outer side of teeth, they and the wires give a bad appearance because they are visible from outside.

Technology for overcoming these problems is disclosed in JP2014-023672A. The technology disclosed in this document relates to a mouthpiece type orthodontic device which comprises a plan view U-shaped base, an expanding peripheral wall projecting upward and downward from an outer periphery of the base to contact upper lip, lower lip and cheek from inside and an aligning peripheral wall projecting upward and downward from an inner periphery of the base to contact upper and lower rows of teeth from inside, whereby inner peripheral surface of the expanding peripheral surface and outer peripheral surface of the aligning peripheral surface are in a state separated by thickness of the rows of teeth.

Although the device according to this technology indeed causes the user no pain or unnatural sensation at gum, has no appearance problem and can overcome the problem of extraneous matter accumulation owing to its removability, the device has an upper/lower tooth positioning problem of not readily ensuring natural and proper occlusal positioning, and has still another shortcoming as an orthodontic device in that it can be expected to cause stronger unnatural feel and discomfort in the mouth when worn than one using brackets and wires.

Moreover, JP2015-150179A discloses technology related to an orthodontic device having shape-memory alloy embedded in each of an outer peripheral wall, an inner peripheral wall and occlusal facets of each of upper and lower jaws of a U-shaped mouthpiece formed of elastic material or flexible material. It is suggested that this enables provision of a removable orthodontic device capable of imparting continuous and suitable force with respect to upper and lower jaws and rows of teeth.

However, this technology also has an issue of being hard to use continuously in a state ensuring natural and proper occlusal positioning, and has additional problems in the points of causing considerable unnatural feel and discomfort when fitted and of being difficult to use as an orthodontic appliance when sleeping or during daily life activities.

Orthodontics is performed using the Bimler device as an orthodontic appliance not using brackets or wires. Bimler therapy is an orthodontic treatment performed by fitting a special appliance at a specified position in the oral cavity and uses an orthodontic appliance particularly effective for straightening teeth of infants with growing jaws by utilizing forces occurring during chewing and swallowing to straighten teeth.

The Bimler device facilitates use of an orthodontic appliance while sleeping and during daily activities, and thanks to being insertable into and removable from the oral cavity, is not subject to extraneous matter accumulation or similar problems, so that the device offers considerable merits in terms of freeing the orthodontic patient from a sense of aversion or discomfort. In actual practice, however, it encounters difficulty in achieving precise straightening by ensuring proper occlusal positioning, because it is still insufficient with regard to the point of enabling continuous use in a state ensuring natural and proper occlusal positioning.

A desire has therefore been felt for development of an orthodontic appliance capable of mitigating sense of aversion and displeasure experienced by people undergoing orthodontic treatment and of enabling precise treatment ensured by proper occlusal positioning.

Patent Document 1: JP2014-023672A
Patent Document 2: JP2015-150179A

OBJECT AND SUMMARY OF THE INVENTION

Problems to be Overcome by the Invention

An object of the present invention is to overcome the aforesaid problems by providing an orthodontic appliance used mainly for use in straightening teeth, which orthodontic appliance enables correction of teeth alignment particularly by ensuring proper occlusal positioning of teeth in oral cavity to thereby achieve precise correction ensuring proper occlusion, and by keeping part of the orthodontic appliance fitted in oral cavity for a certain time period such as during sleep.

Means for Solving the Problem

The present invention orthodontic appliance for achieving the aforesaid object is an appliance for use in a state fitted in oral cavity that comprises an orthodontic unit, to be removably fitted in the oral cavity, and molar caps erected near the orthodontic device, wherein the orthodontic unit comprises a pair of U-shaped devices consisting of a maxillary orthodontic unit and a mandibular orthodontic unit united by wires; teeth are straightened while positions of upper and lower jaws are being adjusted; the molar caps comprise large covering lids for anchoring that are slightly higher than surrounding teeth and are mounted on desired left, right, upper and lower molars to perform occlusal elevation: and the orthodontic unit is configured to be mounted on outer peripheries of the molar caps by locking to the molar caps through grooves provided in the maxillary orthodontic unit of the orthodontic unit.

The molar caps are formed of resin.

Effects of the Invention

As the present invention is configured as described above, it achieves effects such as the following:

1. Since an orthodontic unit that is removably fitted in the oral cavity is used, unpleasant feel experienced by a user using the orthodontic appliance is mitigated, sticking of extraneous matter is minimized, and better appearance can be realized. Moreover, since the molar caps serving as anchor caps are erected near the orthodontic unit, straightening of teeth alignment can be performed while adjusting position of the upper and lower jaws with the orthodontic appliance of unitary shape formed by the maxillary orthodontic unit and the mandibular orthodontic unit.

2. As the molar caps are composed of resin, the caps can be easily formed and orthodontic treatment started immediately.

BEST MODE FOR WORKING THE INVENTION

Figure 1:
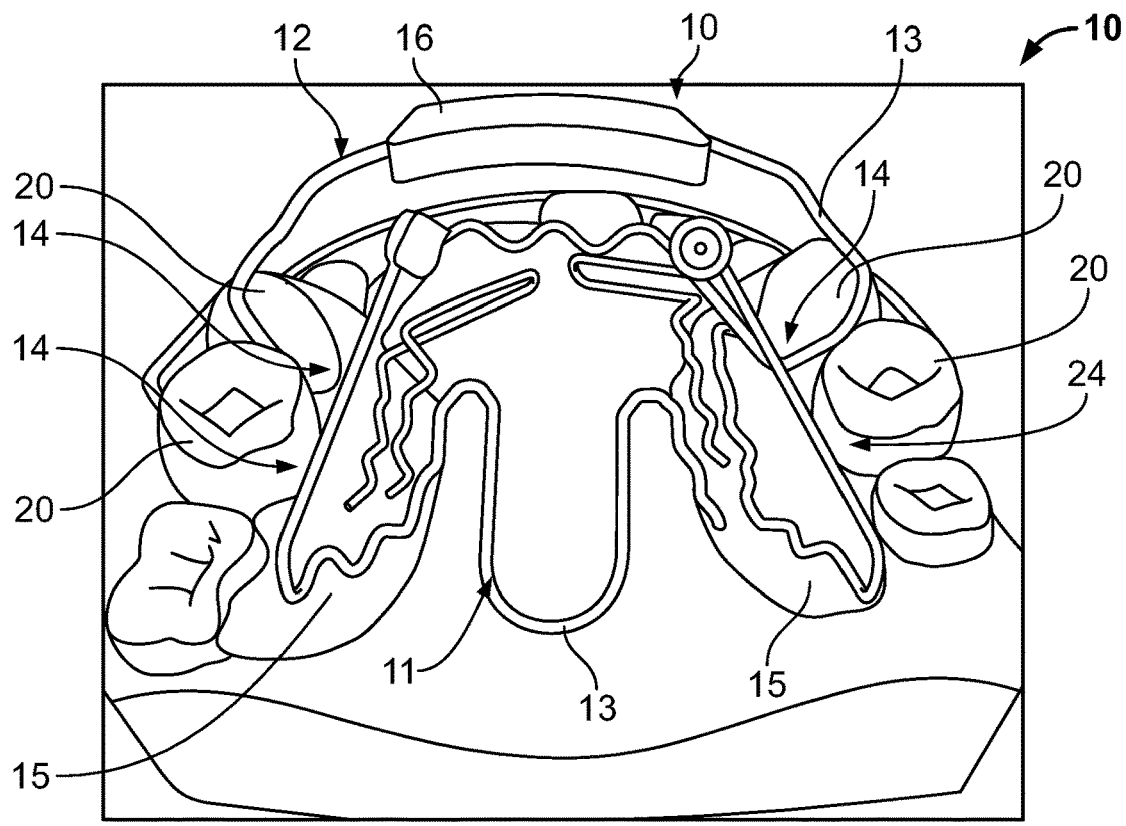
FIG. 1 is a perspective view of an orthodontic appliance of the present invention.
Figure 2:
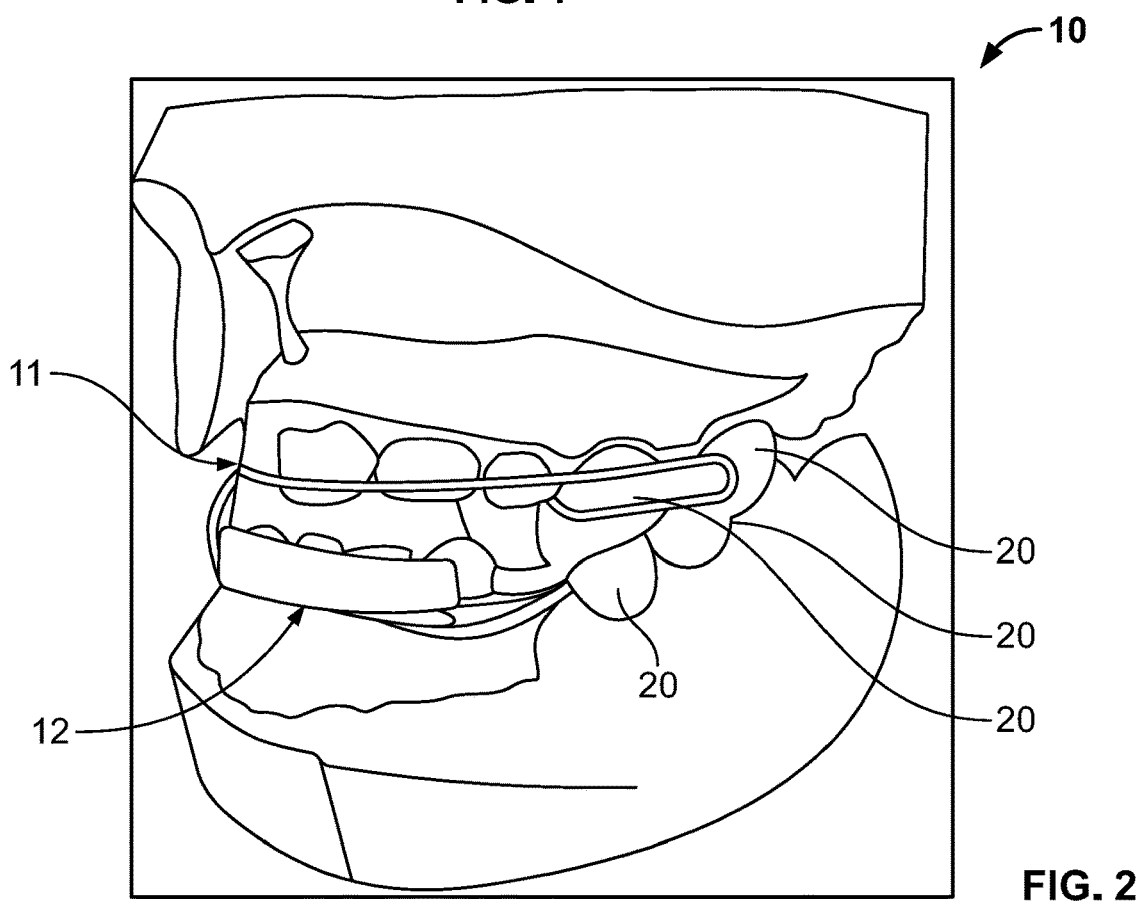
FIG. 2 is a side view of molar caps.
Figure 3:
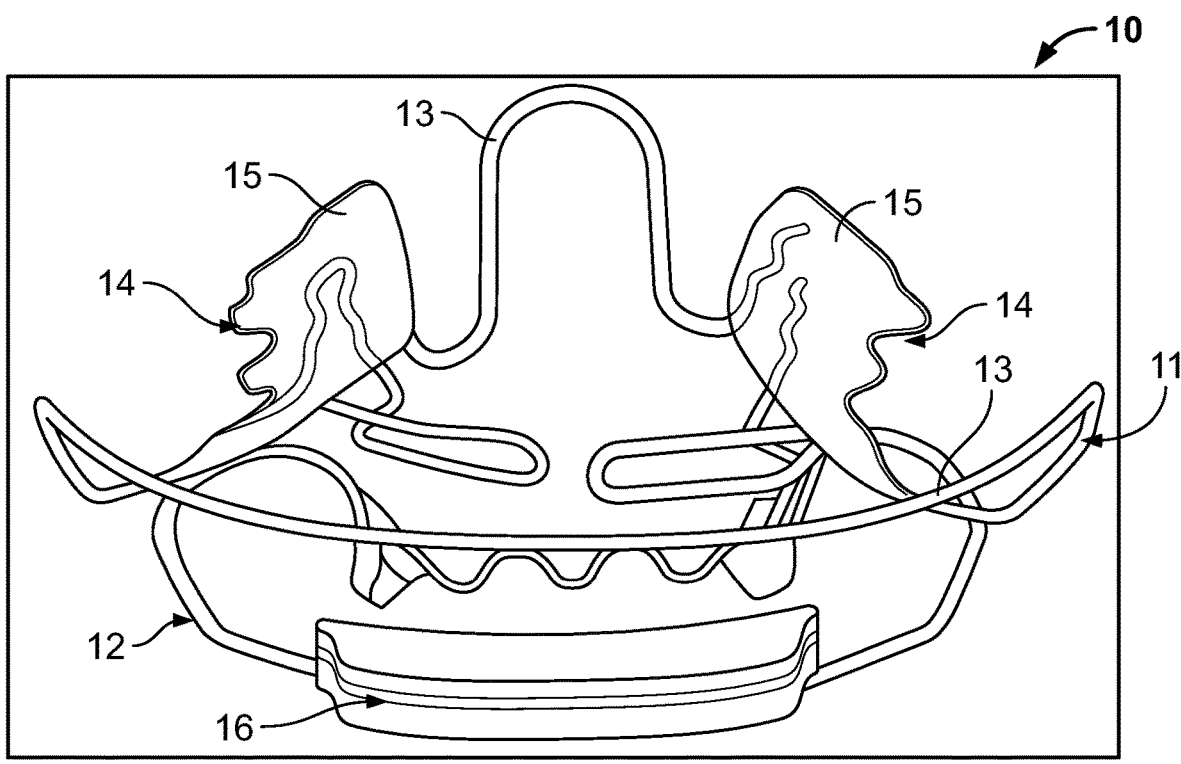
FIG. 3 is a perspective view of an orthodontic (Bimler) device.

The orthodontic appliance according to the present invention is explained in detail below based on an embodiment shown in the drawings. FIG. 1 is a perspective view of an orthodontic appliance of the present invention, and FIG. 2 is a side view of molar caps. FIG. 3 is a perspective view of an orthodontic (Bimler) device. An orthodontic appliance 1 according to the present invention comprises an orthodontic unit 10 and molar caps 20, and orthodontic treatment can be effectively performed using the orthodontic unit 10 as joined to the molar caps 20 by locking engagement.

The orthodontic unit 10 of the orthodontic appliance 1 is a unit for use in a state fitted in the oral cavity mainly during sleep. But the orthodontic appliance 1 of the present embodiment is of a structure that causes no problem during other daily life activities, aside from at mealtime, so that it can achieve high orthodontic effect not only during sleep but also, of course, when worn during daytime activities.

The orthodontic unit 10 is an orthodontic appliance body proper to be removably fitted in an oral cavity, and, as shown in FIGS. 1 and 3, is a frame-like appliance having a maxillary orthodontic unit 11 and a mandibular orthodontic unit 12 as individual orthodontic members. The orthodontic unit 10 is of unitary shape formed by the maxillary orthodontic unit 11 and the mandibular orthodontic unit 12, which, by being individually fitted at proper positions in the oral cavity, perform teeth row (teeth alignment) correction while adjusting positions of the upper and lower jaws. By proper fitting of the appliance, teeth alignment can be performed to achieve adjustment to normal occlusion.

In the present embodiment, the orthodontic unit 10 is focused on use of the Bimler device. As shown in FIG. 3, the Bimler device is an appliance for teeth straightening that does not use brackets or wires and that is widely utilized chiefly as an orthodontic appliance for children. Since an infant's head develops with growth, teeth straightening in infancy is efficient and preferable. The Bimler device is structured to straighten teeth utilizing forces of jaw and tongue movement occurring during chewing or swallowing when the device is fitted, and since it can be freely fitted and removed whenever desired, it leads to relatively little aversion to orthodontic therapy and avoids the adhesion of extraneous matter occurring with use of brackets and the like, so that it mitigates patient physical and mental burden and can be considered especially suitable for small children.

More exactly, when mutual positional relationship between the upper jaw and lower jaw is inappropriate, the orthodontic unit 10 consisting of a Bimler device is a device capable of promoting forward growth of the lower jaw. Basically, it is a structure using a wire 13, wherein wires of a maxillary orthodontic member (maxillary orthodontic unit 11) and a mandibular orthodontic member (mandibular orthodontic unit 12) are unitarily formed, and as simplified, is a structure wherein a pair of U-shaped orthodontic members are formed above and below by folding the elliptical wire 13 (See: Japan Patent Office Library of Standard Technology: Dental Instruments 3 [Orthodontic Therapy] "Technology Name" 3-2-4-4 [Bimler device]).

As shown in FIGS. 1 and 3, the U-shape constituted orthodontic member on the maxillary side (maxillary orthodontic unit 11) is configured to have two maxillary contacts 15 made of resin provided one at each site located between a molar and a canine tooth on left and right sides of the upper jaw and further to have a front portion of the wire 13 abut on maxillary central incisors. When the orthodontic unit 10 is set in place, therefore, the orthodontic unit 10 comes to be anchored between maxillary molars and canine teeth, at two left and right locations, and the maxillary central incisors.

Further, the U-shape constituted orthodontic member on the mandibular side (mandibular orthodontic unit 12) comprises a mandibular contact 16 made of resin provided on an end portion of the U-shape. When the orthodontic unit 10 is set in place, therefore, the orthodontic unit 10 is fitted in place in a state with the mandibular contact 16 pressing mandibular incisors from inside. As the orthodontic unit 10 consisting of a Bimler device is fabricated to match shape of the patient's oral cavity, suitable modification of the orthodontic unit 10 to a different shape is permitted as necessary in view of shape of the patient's oral cavity.

The orthodontic unit 10 consisting of a Bimler device is configured to utilize forces of jaw and tongue movement due to chewing and swallowing to apply occlusal force to the lower jaw, whereby the mandibular contact 16 is pushed forward to press the central incisors from inside the oral cavity and thus promote forward growth of the lower jaw. This performs teeth straightening by achieving appropriate occlusion. Moreover, as the wire 13 simultaneously applies inwardly directed pressure to the maxillary central incisors, rearward movement of the maxillary central incisors can also be realized.

The molar caps 20 are cap-like covering lids erected near the orthodontic unit, and in the present embodiment, as shown in FIGS. 1 and 2, are somewhat large molar-shaped structural members. The molar caps 20 are anchoring caps formed to be fittable and mountable at four molar locations of the upper and lower jaws and are mounted on molars at the four left, right, upper and lower locations to perform occlusal elevation. Although the orthodontic appliance 1 according to the present invention is envisioned to be used mostly in pediatric orthodontics, it can of course also be used by adults, and in the case of adult use it is likely to be applied in a use mode with the molar caps 20 mounted on a different total number of molars from in pediatric use.

As shown in FIG. 2, the molar caps 20 in the present embodiment are large cap-like covering lids that when fitted are slightly higher than surrounding teeth. When the molar caps 20 are fitted, the upper and lower molar caps 20 come to occlude. As a result, occlusion at proper position can be promoted, whereby it has become possible, conjointly with teeth straightening by lower jaw forward growth promotion using the orthodontic unit 10, to perform precise teeth straightening that ensures still more proper occlusal positioning.

As shown in FIGS. 1 and 3, the maxillary orthodontic unit 11 of the orthodontic unit 10 is provided with left and right grooves 14. In the present embodiment, the grooves 14 are cavities cut into the resin maxillary contact 15 provided at sites located between the aforesaid maxillary left and right molars and canine teeth. The grooves 14 are cut in the same shape as the molar caps 20, and as shown in FIG. 1, the molar caps 20 are configured to lockingly engage the outer periphery of the grooves 14 of the orthodontic unit 10. Namely, so that the orthodontic unit 10 can mount on desired left, right, upper and lower molars to perform occlusal elevation, it is configured to lock to the molar caps 20 through the grooves 14 provided in the maxillary orthodontic unit 11. As a result, the orthodontic unit 10 and molar caps 20 can be unitarily utilized, whereby discomfort, unnatural feel and other complaints experienced by a user when the orthodontic appliance 1 is fitted in the oral cavity can be minimized and precise teeth straightening ensuring proper occlusal positioning can be performed while also promoting forward growth of the lower jaw.

Optionally, the grooves 14 on side surfaces of the orthodontic unit 10 are sometimes utilized for locking to an orofacial region side surface due to their shape to be capable of locking to an orofacial region side surface covered by the molar caps 20.

In the present embodiment, the molar caps 20 are made of resin. The resin is a type of synthetic resin, i.e., a substance composed of an artificially manufactured highly polymerized compound. In dental treatment, such resins that can be easily deformed and hardened are used, inter alia, to treat teeth with missing portions, so that making the molar caps 20 using resin facilitates their fabrication and enables immediate start of orthodontic treatment.

By using the molar caps 20 with primary emphasis on a vertical approach (optimizing occlusion) in combination with the orthodontic unit 10 consisting of a Bimler device with primary focus on a horizontal approach (promoting lower jaw forward growth), it has been made possible to ensure proper occlusal positioning of teeth in the oral cavity and thereby perform precise straightening that ensures correct occlusion. In other words, by using the orthodontic appliance 1 according to the present invention, it has become possible to perform orthodontic treatment that mitigates physical and mental burden on the orthodontic patient and minimizes stress of both the patient and the practitioner.

EXPLANATION OF SYMBOLS

Orthodontic appliance
10 Orthodontic unit
11 Maxillary orthodontic unit
12 Mandibular orthodontic unit
13 Wire
14 Groove
15 Maxillary contact
16 Mandibular contact
20 Molar cap

The invention claimed is:

1. An orthodontic appliance for use in a state fitted in an oral cavity, comprising:
an orthodontic unit removably installable in the oral cavity;
molar caps erected near the orthodontic unit;
the orthodontic unit comprises a pair of U-shaped devices formed of a maxillary orthodontic element and a mandibular orthodontic element united by wires, the orthodontic unit configured to straighten teeth of the user while positions of upper and lower jaws are being adjusted;
the molar caps comprise covering lids for anchoring that are higher than surrounding teeth and shape corresponding to molars, and the molar caps mounted on each upper and lower molar and on the position where the upper and lower molar caps come to occlude, to optimize an occlusion by occluding the upper and lower molar caps;
the orthodontic unit being mountable on desired left, right, upper and lower molars through said molar caps to perform an occlusal elevation, the orthodontic unit being lockable to the molar caps through grooves provided in the maxillary orthodontic element of the orthodontic unit and cut in a same shape as the molar caps, thereby mounting on outer peripheries of the molar caps and the orthodontic unit and molar caps can be unitarily utilized.

2. The orthodontic appliance according to claim 1, wherein the molar caps are made of resin.

* * * * *